United States Patent [19]

Munemasa et al.

[11] Patent Number: 5,335,084
[45] Date of Patent: Aug. 2, 1994

[54] DOCUMENT IMAGE FILING SYSTEM HAVING INPUT COLOR MODE SELECTING CAPABILITY

[75] Inventors: Narihiro Munemasa, Kawasaki; Fumio Wakamori, Tokyo; Hidefumi Masuzaki, Hadano; Masaaki Fujinawa, Odawara; Yasuo Kurosu, Yokosuka, all of Japan

[73] Assignee: Hitachi, Ltd., Tokyo, Japan

[21] Appl. No.: 892,960

[22] Filed: Jun. 3, 1992

[30] Foreign Application Priority Data

Jun. 3, 1991 [JP] Japan .................. 3-130979

[51] Int. Cl.$^5$ ............................. H04N 1/46
[52] U.S. Cl. ................................... 358/403
[58] Field of Search ............... 358/400, 401, 403, 500, 358/501, 530

[56] References Cited

U.S. PATENT DOCUMENTS 4,931,860  6/1990  Narumiya ................. 358/75
5,029,112  7/1991  Sakamoto et al. ........... 364/521
5,231,482  7/1993  Murakami et al. ........... 358/75

OTHER PUBLICATIONS

Hitachi Manual, "Hitachi's Optical Disk Filing System, Hitfile 650" No. 2250-10-012-20 pp. 6-19.

*Primary Examiner*—Bentsu Ro
*Attorney, Agent, or Firm*—Antonelli, Terry, Stout & Kraus

[57] ABSTRACT

In an image filing system including an image scanner having at least a color mode and a monochrome mode as image input mode, for inputting document images; a key device for designating the image input mode of the image scanner, an image file for storing document image data inputted from the image scanner and a display screen on which the document images are displayed, a background corresponding to the image input mode is outputted when the document image inputted for the image scanner is displayed on the display screen. If a monochrome document is inputted for processing in a full color or multicolor mode, a monochrome input image and the background which is specific to the full color or the multicolor mode are outputted. Accordingly, a user which looks at the display notices that he or she should change the input mode and inputs the document image again prior to registration of the inputted image in a file.

4 Claims, 6 Drawing Sheets

DOCUMENT IMAGE FILING SYSTEM HAVING INPUT COLOR MODE SELECTING CAPABILITY

BACKGROUND OF THE INVENTION

1. Field of the Invention

The present invention relates to a document image filing system and in particular to a document image filing system having an input color mode selecting capability.

2. Description of the Related Art

Document image filing systems using optical disks are currently widely used as means of documentary management. The optical disks have a high capacity of storing data and are capable of recording a large quantity of image data. Accordingly, the optical disks are widely used as means for storing images of documents such as design drawings, contract documents and account books. If a document image is inputted into such a document image filing system, scanning operation is usually commenced after input mode information including paper size of a document to be inputted, line density, input density, designation information on whether the document is a character document or a half tone document has been set by an entry device such as an operation key provided on the scanner or a keyboard for document retrieval. The input image read by the scanner is displayed on a display screen. A user confirms the state of the document image on the display screen and determines whether or not the image is appropriate for registration on the file.

When a document image is registered in a file, it is necessary to confirm the input mode information such as paper size and line density which were preset for inputting the image as well as the picture quality of the document image which is actually inputted. Confirmation of the input mode has heretofore been made by confirming the state of the operation key of a scanner or a character array such as "A4. high definition" displayed in a given position of a display as is described at page 9 of an instruction manual for optical disk filing system of Hitachi Ltd. (Manual No. 2250-10-012-20).

Document image filing systems which are capable of storing color document images have recently been demanded to cope with the diversification of inputted document images. Generally, a color image requires the amount of data which is several to several ten times as much as that of a binary monochrome image. For example, if a document image is inputted in an RGB multivalued mode having 256 gradations, the amount of data would be 24 times as much as that in case where the document image is inputted in the binary monochrome mode. Accordingly, selection of a mode whether the inputted image is stored as a color data or a monochrome data gives a great influence upon the number of document images which can be stored in a memory medium such as optical disk.

A method of confirming the input mode based upon the state of the operation key of a color scanner or a character array such as "FULL COLOR MODE" displayed in a given position of a display has a high possibility of mistaking of the current input mode when confirmation whether an input image is appropriate or not is made prior to the registration of the document image.

If the last user of the filing system has inputted the image data in the full color mode in which a large capacity of memory is used, there is the possibility that the next user inputs document images in the previous input mode which has been preset by the previous user without changing the mode to an appropriate mode and registers them in a file. Even if the document to be inputted which is a monochrome document at this time is mistakingly inputted in the full color mode, the inputted image displayed on the display is, of course, a monochrome image. Accordingly the user who is devoted to the inputted image displayed on the screen after completing the scanning operation only checks whether or not the image has been scanned without skew when the inputted monochrome image is displayed on the screen. There is the possibility that he or she registers the image data in a file without noticing the wrong selection of the input color mode.

SUMMARY OF THE INVENTION

It is, therefore, an object of the present invention to provide a document image filing system which enables a user to easily confirm the color mode and is capable of preventing wrong selection of the input color mode.

In order to accomplish the above mentioned object, the present invention provides a document image filing system, comprising: image input means having at least color and monochrome modes as image input mode for inputting document images; means for designating the image input mode of said image input means operated by a user; filing means for storing document image data inputted from said image input means; display means for displaying document images; and control means for outputting a background image corresponding to the input mode of the inputted image on the display when the document image inputted from said image input means is displayed on said display means.

Since the color or pattern of the background of the display of the document image or a given area which a user readily looks at is changed in response to the input mode of the image in accordance with the present invention, the user can easily determine or identify the kind of the current input mode of the image input device. This prevents the file capacity from being wasted due to wrong selection of input mode which otherwise occurs, for example, when a monochrome document is mistakenly inputted in the full color mode and is registered.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1A:
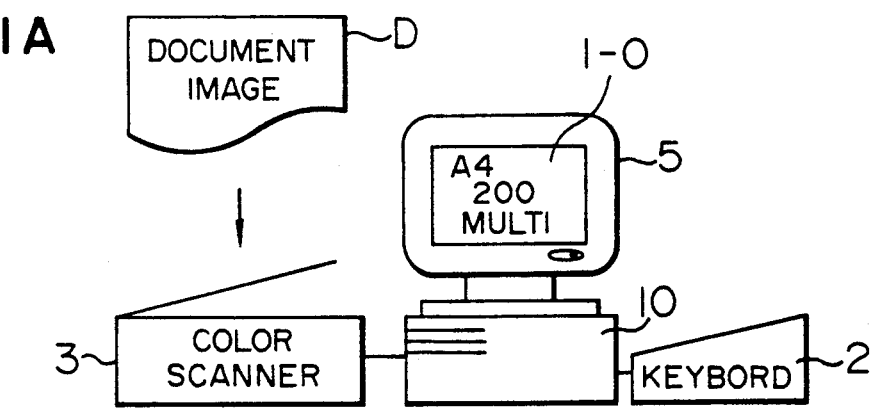
FIGS. 1A to 1C are schematic views showing basic functions of registration processing of image data in a document image filing system of the present invention.
Figure 1B:
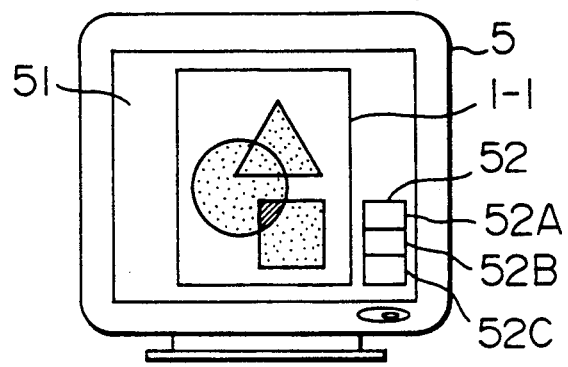
Figure 1C:
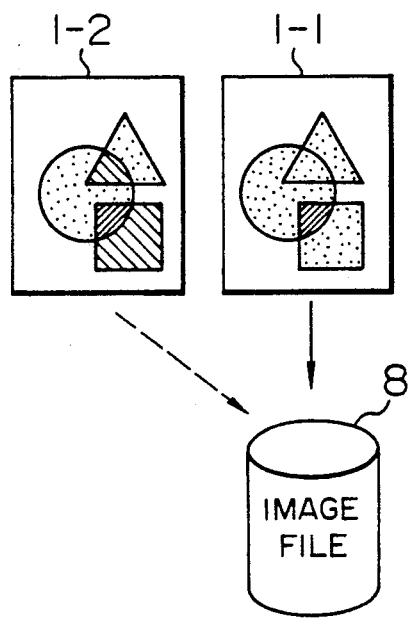

FIGS. 1A through 1C show the basic functions of a document image filing system of the present invention.

In FIG. 1A, when information on input mode such as paper size, line density and color mode are set by manipulation of function keys of a color scanner 3 or a keyboard 2. An initial display 1-0 including the input mode information is displayed on a display 5 of an image filing system 10. In this case, the initial display 1-0 indicates that paper size, line density and color mode are "A4", "200 dpi" and "multicolor mode", respectively.

The item of the input mode information which is particularly important to avoid wasting of file capacity is color mode. It is preferable to change, for example, the background of the display in response to the color mode in such a manner that the users notice the current color mode at the glance. For example, display of a seven-color bar, a three-color bar and a gray bar in the background of the initial display 1-0 in a full color mode, a multicolor mode and a monochrome mode, respectively enables the user who is operating the scanner to readily notice from the output state of the display 5 which mode the color mode is.

If a document image D is inputted to the scanner 3 after the scanner 3 has been brought into a desired input mode by the user's manipulation of the operation, key of the scanner 3 or the keyboard 2, an input document image 1-1 which has been processed in the set input mode is displayed on the display 5 as shogun in FIG. 1B. At this time, a window 52 including attribute data of the input document image such as paper size 52A, line density 52B and input color mode 52C is simultaneously displayed on the display 5. The background 51 of the display is changed to that corresponding to the color mode. If the user desires to change the color mode into the other mode at this time, the document image D is inputted from the color scanner 3 again after changing the color mode. The document image which has been inputted again is displayed on the display screen similarly to the image 1-1.

Alternatively, the initial document image 1-1 may be temporally preserved when the document image is inputted again. The image 1-1 which has been inputted already and the image 1-2 which is inputted again are simultaneously displayed on the display as shown in FIG. 1C. The user may select a desired image among a plurality of document images 1-1, 1-2, ... which have been inputted in different input modes for registering the selected image in a file 8.

Figure 2:
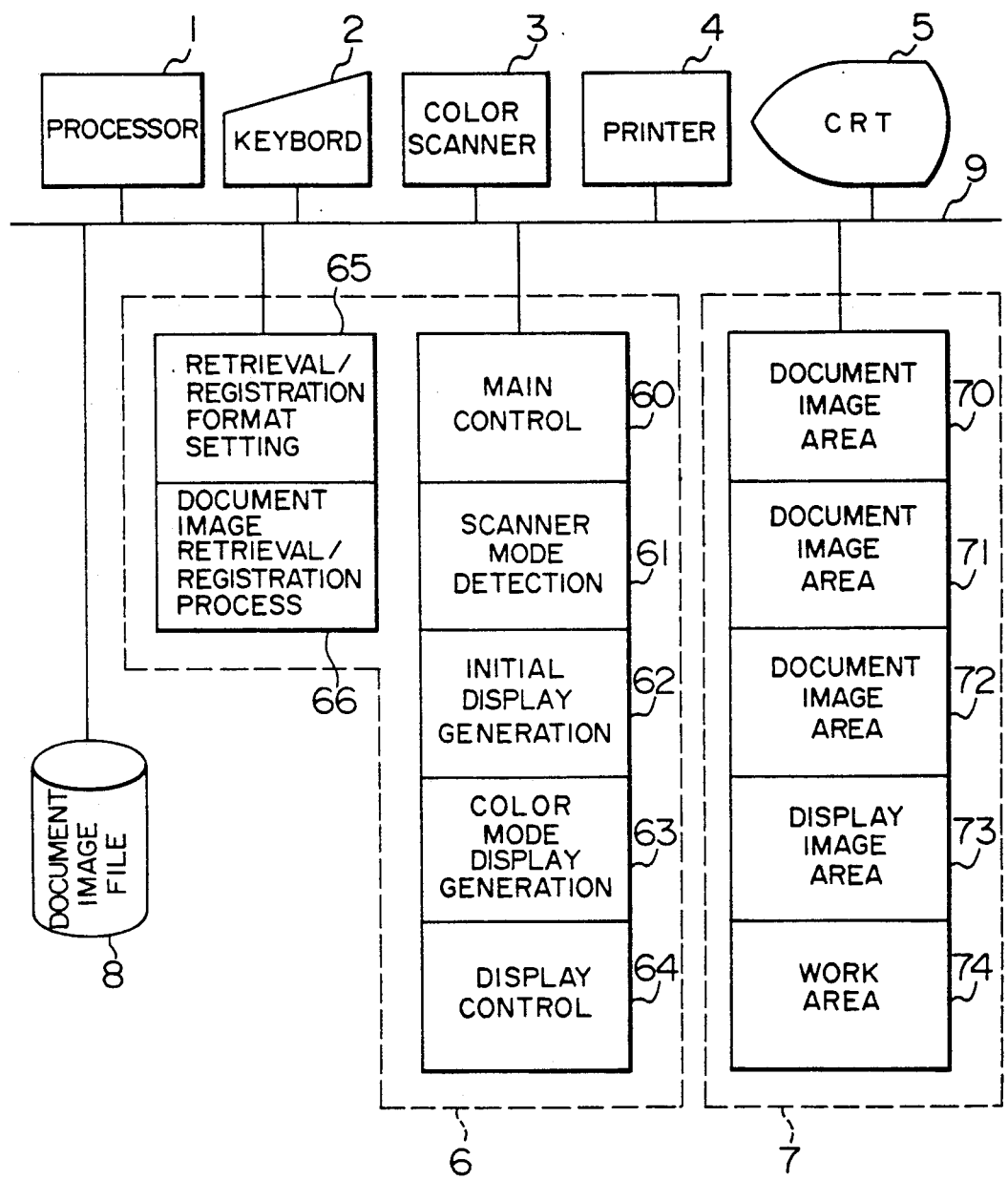
FIG. 2 is a block diagram showing an example of the hardware configuration of a document image filing system of the present invention.

FIG. 2 is a schematic block diagram showing the hardware configuration of a document image filing system of the present invention.

In the drawings, a reference numeral 1 denotes a processor for executing registration/retrieval of images; 2 denotes a keyboard for inputting commands or data, which is operated by the user; 3 a color scanner for converting an image which is read from a document to be inputted into an image data corresponding to a designated input mode; 4 a printer for printing a document image; 5 a display for displaying document images; 6 a memory for storing therein a program which is executed by the processor 1; 7 a memory for storing the data which is used by the processor 1; 8 a document image file for storing document image data therein; and 9 a bus for connecting these components with each other.

The memory 6 comprises a main control unit 60 which controls the whole of the filing system; a scanner mode detection unit 61 for storing a subroutine program, which detects input modes such as paper size, line density and inputted color mode which are set by the color scanner; an initial display generating unit 62 for storing a subroutine program which generates an initial display corresponding to a scanner mode detected by the scanner mode detecting routine; a color mode selecting display generating unit 63 for storing a subroutine program which generates a given display corresponding to the attribute of inputted document image; a display control unit 64 for storing a subroutine which controls the display generated by the color mode selecting routine; a retrieval/registration format setting unit 65 for a subroutine which presets the format of "file name" or "document name" which is necessary to retrieve or register a document image; and a document image retrieval/registration unit 66 for storing a subroutine program for retrieving/registrating a document image in accordance with the format data designated by the user.

The memory 7 comprises document image storing areas 70 to 72 for storing the image data of inputted documents; display image storing area 73 for storing information on the image to be displayed and a work area 74. In the present embodiment, the input color mode preset by the color scanner 3 includes three modes such as "full color mode", "multicolor mode", and "monochrome mode" and the inputted image data is stored in one of the document image storing areas 70, 71 and 72 depending upon the color mode. It is to be understood that the inputted color modes have been described for the sake of convenience and does not limit the scope of the present invention.

Figure 3:
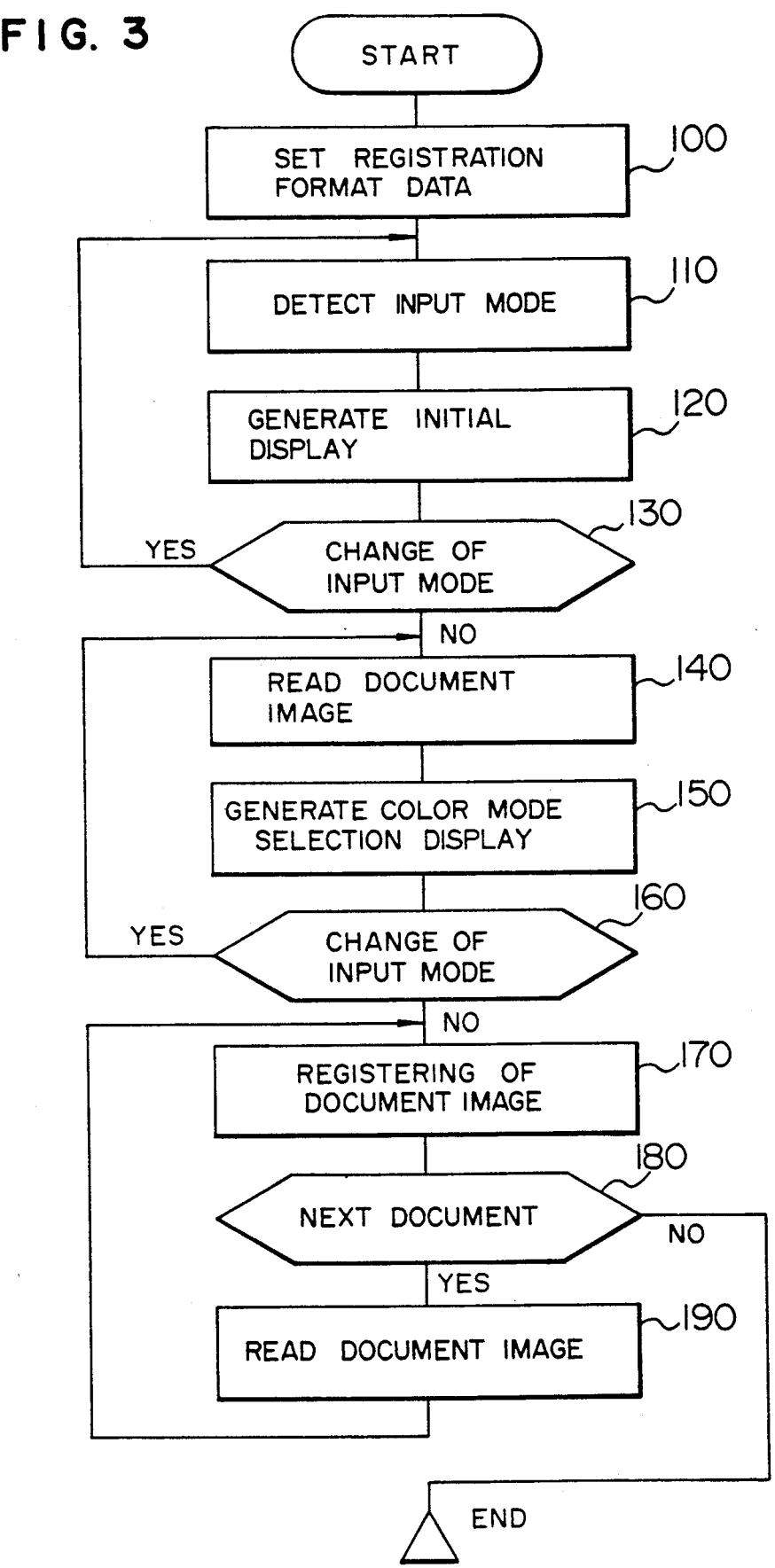
FIG. 3 is a basic flow chart showing the operation of the document image filing system.

FIG. 3 is a basic flow chart showing operation for the document image registration among the capabilities of the document image filing system. In step 100, the user sets registration format such as "file name" or "document name" into the retrieval/registration format setting unit 65 by entry into an input device such as keyboard. Then, in step 110, information on the input mode (scanner mode) of the color scanner 3 such as paper size, line density and input color mode which the user has inputted is detected by the scanner mode detecting unit 61. After completion of the information input operation of all items of input modes necessary for image filing, an initial display corresponding to the input mode is generated by the initial display generating unit 62 and is displayed on the display 5 in step 120.

Figure 4:
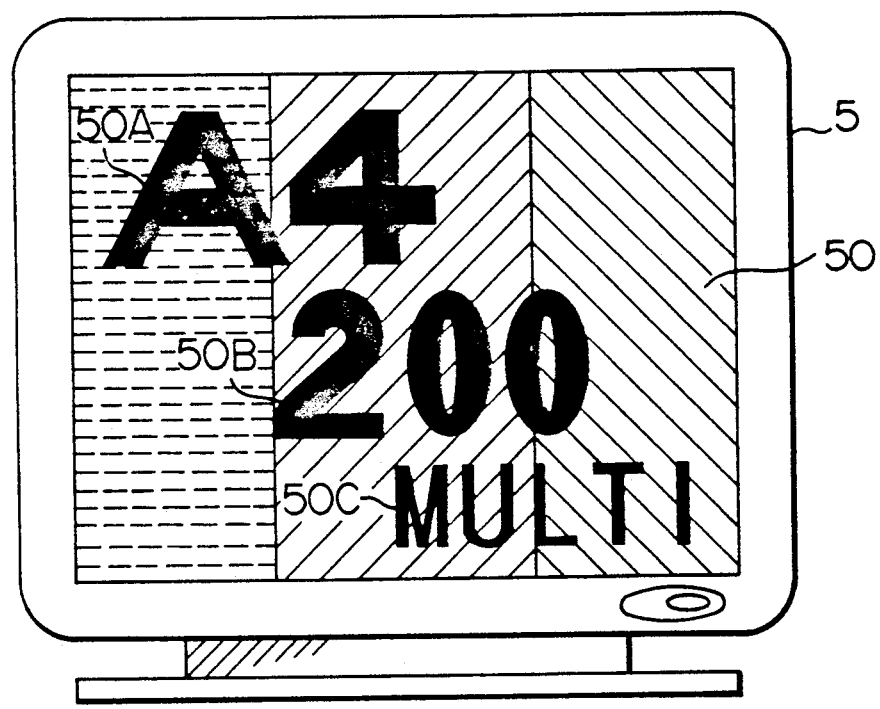
FIG. 4 is a view showing an initial display on the screen representing an input mode of a scanner.

An example of the input mode display (initial display) outputted on the display 5 at this time is illustrated in FIG. 4. The initial display generating unit 62 displays a character array 50A representative of the paper size, a character array 50B representative of the line density and a character array 50C representative of inputted color mode in accordance with the mode information detected by the scanner mode detecting unit 61. Character arrays representative of input density, character original document and half tone may be displayed as well as these items. Display of the input color mode can be made clear by changing the background of the display depending upon the color mode so that the user can identify the current mode at a glance.

The background 50 is a seven-color bar, a three-color bar and gray when the input mode is the full color mode, a multicolor mode and a monochrome mode, respectively. The color mode display is not necessarily made over an entire of the background 50 and may be made in a given area or a given character and figure area in the background which is located in an outstanding position in the initial display.

Now, returning to FIG. 3, an inputted instruction from the user is determined in step 130. If the input mode of the color scanner 3 has been changed, the program sequence is returned to step 110. If starting of the scanner 3 is instructed, the program proceeds to step 140. The color scanner 3 is started in step 140 to accept the inputted document image into one of the memory areas 70 to 72 depending upon the input color mode. A color mode selecting display is generated from the image data stored in the document image area 70, 71 or 72 by the color mode selecting display generating unit 63 in step 150.

Figure 5A:
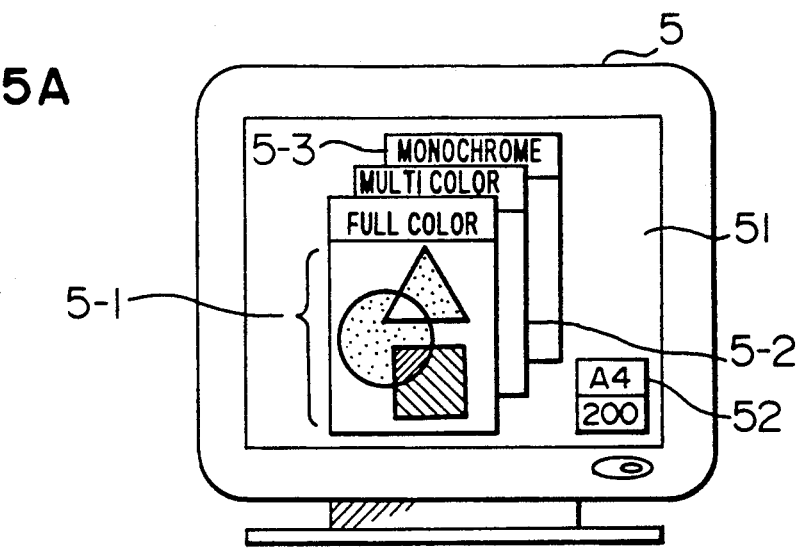
FIGS. 5A to 5C are view showing examples of display for selecting the color mode.
Figure 5B:
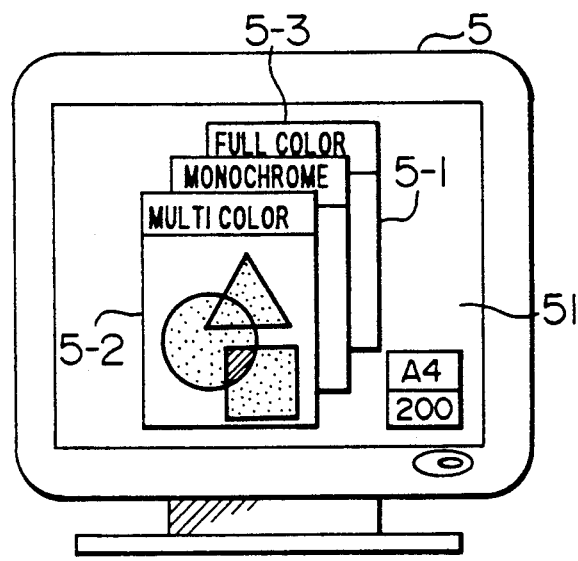
Figure 5C:
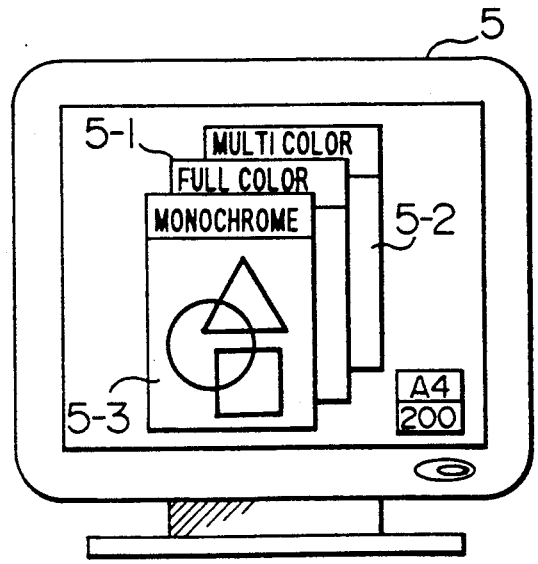

FIGS. 5A to 5C show one example of the color mode selecting display. In this case, an display using multi-window is illustrated. The color mode selecting display generating unit 63 displays the full color, multicolor, and monochrome image display windows 5-1, 5-2 and 5-3 corresponding to the document image storing areas 70, 71 and 72, respectively. At this time, it suffices to position a window corresponding to the current input color mode in the frontmost position and to change the background 51 of the display in response to the input color mode of the frontmost window image.

FIGS. 5A, 5B and 5C show displays when the full color, multicolor and monochrome modes are selected, respectively. If a document image is inputted in the full color mode in step 140 of FIG. 3, the color mode selecting display including the full color image display window 5-1 of document image which is positioned in the frontmost position is displayed as shown in FIG. 5A. At this time, it suffices to display a seven-color bar in the background 51 of the display to readily notice that the displayed image is inputted in the full color mode.

Determination whether or not the color mode has been changed is made in step 160. When the user desires to input again in the multicolor mode the image which has been inputted in the full color mode, instruction of changing the modes is performed by pointing the multicolor image display window 5-2 with a mouse or the keyboard. If changing of modes is instructed, the color mode selecting display is changed from the state of FIG. 5A to the state of FIG. 5B. The multicolor image display window 5-2 is disposed in the frontmost position and a document image which is inputted in the multicolor mode again is displayed in the window 5-2. At this time, the background 51 of the display is changed to the background which is specific to the multicolor, for example, a three-color bar to represent that the displayed image has been inputted in the multicolor mode. At this time, document images corresponding to respective input modes are displayed in the full color and multicolor image display windows 5-1 and 5-2. The user can call appropriately one of these window in the frontmost position by pointing it with a mouse or keyboard, and can freely compare document images which have been inputted in different color modes. Instruction not to change the color mode is made by pointing the frontmost window with the mouse or keyboard. If determination that the color mode is to be changed is made in step 160, the program sequence returns to step 140. If determination that the color mode is not changed is made in step 160, the program sequence proceeds to step 170.

In step 170, a document image which has been designated in step 160 is registered in the document image file 8 in accordance with the registration format designated in step 100. Thereafter, determination whether or not there is a next document paper to be processed for inputted in the scanner is made in step 180. If there is a next document, the program sequence proceeds to step 190. After next document image is processed for reading in the same input mode as the just previous input mode, the program sequence returns to step 170. If there is no next document paper, this routine is terminated.

Figure 6:
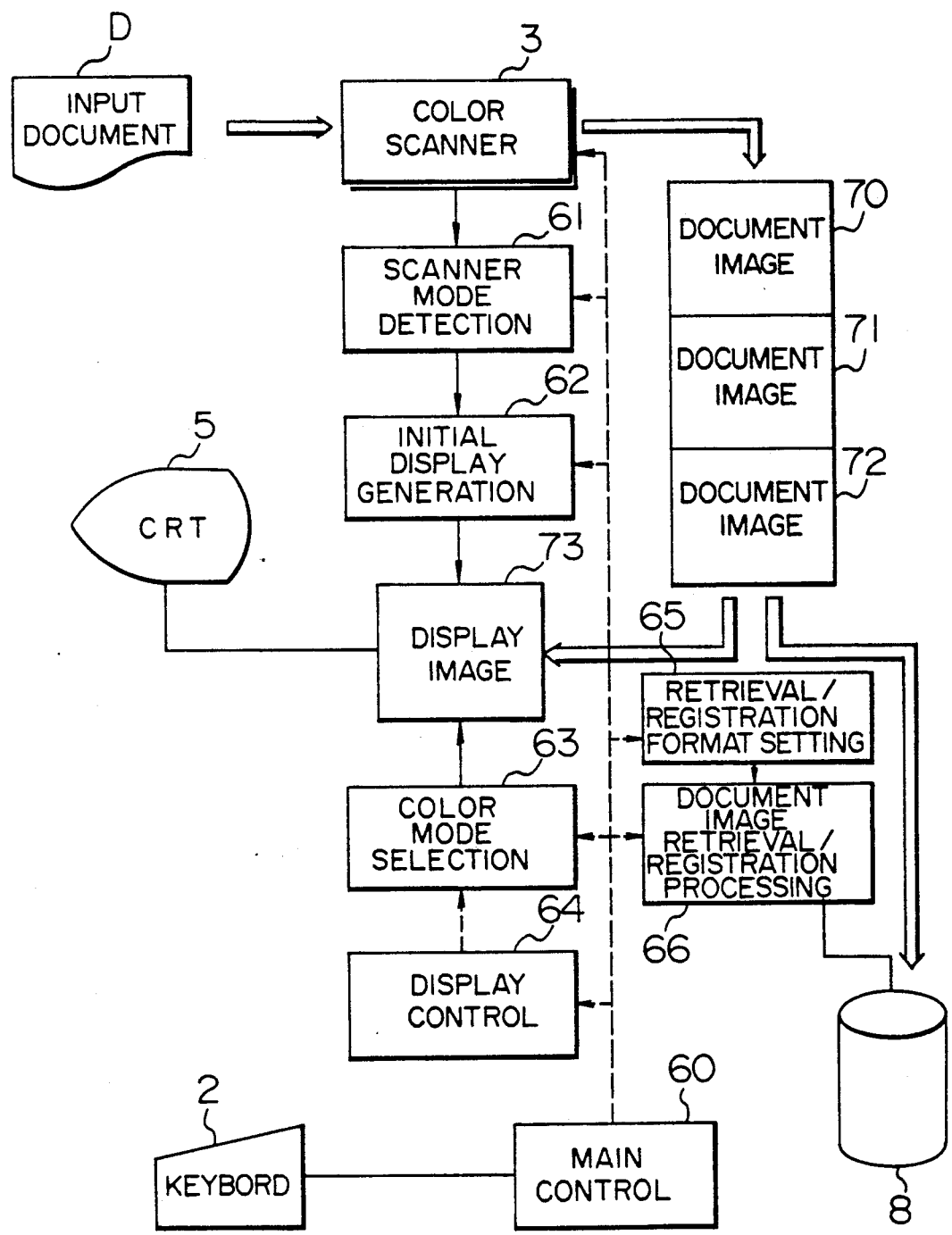
FIG. 6 is a block diagram showing the data flow in a document image filing system of the present invention.

FIG. 6 shows a data flow in the above mentioned document image filing system.

The scanner mode detection unit 61 detects the current input mode (scanner mode) preset by the color scanner 3. The initial display generation unit 62 generates an initial display corresponding to the scanner mode which is detected by the detection unit 61 and stores it in the display image storing area 73. The initial display is displayed on the display 5 in accordance with the display data stored in the memory area 73.

The main control unit 60 activates the color scanner 3 to store the inputted document image data in the document image storage areas 70, 71 or 72 which corresponds to the input color mode (full color, multicolor or monochrome mode), respectively.

The color mode selecting display generation unit 63 generates a color mode selecting display in accordance with the image data stored in the document image storing areas 70, 71 and 72 and writes it in the display image storing area 73.

The display control unit 64 activates the color mode selecting display generation unit 63 in accordance with an instruction of the user from the keyboard or mouse and updates the color mode selecting display stored in the display image storing area 73.

The document image retrieval/registration unit 66 registers the document image in the document file 8 in the format preset by the retrieval format setting unit 65.

It is apparent from the foregoing embodiment that the color or pattern of the entire or a given area of the background of the display in which inputted document images are displayed is changed in response to the color mode of the inputted image. Accordingly, the user can readily identify the kind of the color mode. This can prevent the user from mistakenly selecting the input color mode, for example, as inputting a monochrome documents in the full color mode.

We claim:

1. A document image filing system, comprising:
    image input means having at least color and monochrome modes as image input mode for inputting document images;
    means for designating the image input mode of said image input means operated by a user;
    filing means for storing document image data inputted from said image input means;
    display means for displaying document images; and
    control means for outputting a background image corresponding to the input mode of the inputted image on the display when the document image inputted from said image input means is displayed on said display means.

2. A document image filing system as defined in claim 1, wherein said control means includes means for generating a background having a color or pattern which is specific to the input mode of said image input means when the document image is displayed on said display means.

3. A document image filing system as defined in claim 1 in which said control means includes means for outputting a color or pattern specific to the input mode of said document image input means in a given of partial area of the display image when the document image is displayed on said display means.

4. A document image filing system as defined in claim 1 in which said control means includes means for outputting a display including a given character and figure array or a pattern corresponding to the input mode designated by said display means in response to the input mode instruction from said mode designating means.

* * * * *